United States Patent [19]

Zwiebel

[11] Patent Number: 4,561,538
[45] Date of Patent: Dec. 31, 1985

[54] TAKE-UP APPARATUS

[75] Inventor: Rudy P. Zwiebel, Cudahy, Wis.

[73] Assignee: Magnetics International, Inc., Cudahy, Wis.

[21] Appl. No.: 559,643

[22] Filed: Dec. 9, 1983

[51] Int. Cl.⁴ .............................................. B65G 23/44
[52] U.S. Cl. ..................................... 198/816; 474/133
[58] Field of Search ....................... 198/816, 813, 864; 474/112, 113, 133

[56] References Cited

U.S. PATENT DOCUMENTS

| 446,444 | 3/1891 | Bryce | 91/152 |
|---|---|---|---|
| 1,700,631 | 1/1929 | Festini | 474/112 |
| 1,902,980 | 3/1933 | Wilhelm | 474/112 |
| 2,042,655 | 6/1936 | Ferry | 198/816 |
| 2,420,836 | 5/1947 | Nelson, Jr. | 474/112 |
| 2,469,296 | 5/1949 | Farrell et al. | 474/112 |
| 2,909,074 | 10/1959 | Scheiterlein | 198/813 |
| 3,456,776 | 7/1969 | Viene | 198/813 |
| 3,511,358 | 5/1970 | Peterson | 198/864 |
| 4,128,952 | 12/1978 | Duke et al. | 198/816 |
| 4,222,280 | 9/1980 | Stewart | 474/112 |
| 4,237,744 | 12/1980 | Jolly | 474/112 |

FOREIGN PATENT DOCUMENTS 2328901 12/1973 Fed. Rep. of Germany ...... 198/816

Primary Examiner—Joseph E. Valenza
Assistant Examiner—Kyle E. Shane
Attorney, Agent, or Firm—Wood, Dalton, Phillips, Mason & Rowe

[57] ABSTRACT

The present invention comprises a take-up apparatus for endless belts, chains, or the like surrounding spaced pulleys or sprockets. The take-up apparatus comprises a pivotable first extendable bearing member and a second sleeve member. The first extendable member rotatably carries the shaft of one of the pulleys and the second sleeve member includes a tension adjusting mechanism. The apparatus is pivoted about a boss located on the sleeve member. Accordingly, the pulley carried by the extendable member is directly pivoted in an arc having a radius defined between the pivot axis of the apparatus and the axis of rotation of the pulley shaft. At least a portion of the sleeve member is defined by telescoping portions so that the distance between the pivot axis of the arm and the pulley shaft axis is adjustable to vary the tension on the belt.

10 Claims, 3 Drawing Figures

TAKE-UP APPARATUS

DESCRIPTION

1. Background of the Invention

This invention relates to a take-up apparatus and, more particularly, to an adjustable take-up mechanism for an endless belt or like device.

2. Description of the Prior Art

Take-up apparatuses for endless chains, belts, tracks, films and the like have been known for long periods of time. The different prior apparatuses include eccentrically mounted idlers, eccentrically mounted pulleys, eccentrically mounted sprockets, planetary gears, pivoted segments supporting pulleys, translating slides supporting pulleys, and many more.

Without going into all of the uses and problems associated with the need to tension and reposition endless belts, chains and the like, one or two prior art devices will be described to illustrate the problem. Conveyors employing endless belts, as known in the art, typically have spaced, cylindrical pulleys which are surroundingly engaged by the belt. One of the pulleys is mechanically driven and frictionally engages the belt to effect advancement. A housing suspends the pulleys and in one situation consists of two, laterally spaced, upright walls bounding an unobstructed region within which the belt is operable. The conveyor belt width is slightly less than the lateral spacing between the walls so that foreign matter will not readily find its way between the belt and walls. The flat, upper surface of the traveling belt remains substantially flush with the upper ends of the walls. This makes the conveyor more versatile by accommodating articles having a width greater than the width of the belt.

It is inevitable that some dirt and other foreign matter end up in the region between the walls of the housing and also below the belt. Heretofore, cleaning and/or removing of such extraneous matter has required substantial disassembly of the conveyor assembly. It is particularly critical when handling food articles that the entire mechanism be readily accessible for cleaning to meet USDA food grade specifications. However, structure to effectively accomplish this is not known in the art.

It is also desirable that the tension on the conveyor belt be adjustable simply and by a mechanism that is not prone to dirt accumulation. One proposed mechanism for tensioning an endless member is disclosed in U.S. Pat. No. 2,469,296, to Farrell et al. In Farrell et al an idler pulley is carried by a vertically adjustable plunger. The pulley bears against the outside surface of the belt and serves both to drive and to adjust the tension of the belt.

Such an arrangement is impractical if incorporated into a conveyor system including a belt with a substantial width. The frictional forces generated by the additional belt engaging structure, namely the pulley, impede belt travel. Further, driving the conveyor belt with the Farrell et al structure is impractical, as the friction engaging surface of the drive pulley may not be substantial enough to effect a positive drive.

Not only are the prior art devices impractical in terms of adjustable tensioning of a conveyor belt, but the belt, when relaxed according to the art, does not allow access therebelow to permit cleaning and/or repair of the system.

The present invention is specifically directed to overcoming the above enumerated problems.

SUMMARY OF THE INVENTION

The present invention comprises a take-up apparatus which may be used in a conveyor system of the type having an endless belt surrounding spaced pulleys and a housing having laterally spaced upright walls between which the belt is driven.

The take-up apparatus, according to the present invention, comprises a pivoting arm with first and second end portions. The first end portion of the take-up apparatus rotatably carries one end of the shaft of one of the pulleys, for instance, the guide pulley, and the second end portion carries a tension adjusting mechanism for adjusting the tension of the belt around the pulleys. An intermediate transverse boss between the first and second end portions is provided for mounting the take-up apparatus and about which the take-up apparatus is pivoted. Accordingly, the guide pulley itself is directly pivoted in an arc having a radius defined between the pivot axis of the take-up apparatus and the axis of rotation of the guide pulley shaft.

To arrive at a relaxed belt position from a tensioned belt position, the guide pulley is grasped and lifted whereby the take-up apparatus is pivoted so that the first end portion and the attached pulley are elevated and disposed upwardly out of the normal operating plane of the belt. Accordingly, the belt is elevated and sags so that access can be had beneath the belt to clean and/or repair the apparatus. Movement between the relaxed and tensioned state of the belt is accomplished through simple rotation of the take-up apparatus by grasping and pulling forward and downward on the pulley to move the pulley and take-up apparatus into its normal operating position. To assist belt manipulation, take-up assembly is provided on both sides of the conveyor apparatus.

The tension adjusting capability is incorporated into the take-up apparatus and has preferably a sealed construction so that accumulation of foreign matter is minimized. At least a portion of the length of the arm of the take-up apparatus comprises separate cylinders, mating telescopically, one within the other, so that the arm length outward of the transverse boss can be adjusted. The inner cylinder is threaded to receive an adjusting screw which bears against an annular shoulder associated with the outer cylinder. Preferably, resilient seals are disposed between the mating surfaces of the inner and outer cylinders to maintain a seal that is both dust and water tight. Consequently, the take-up apparatus is substantially internally contained and cleaning thereby facilitated.

DETAILED DESCRIPTION OF THE DRAWINGS

Figure 1:
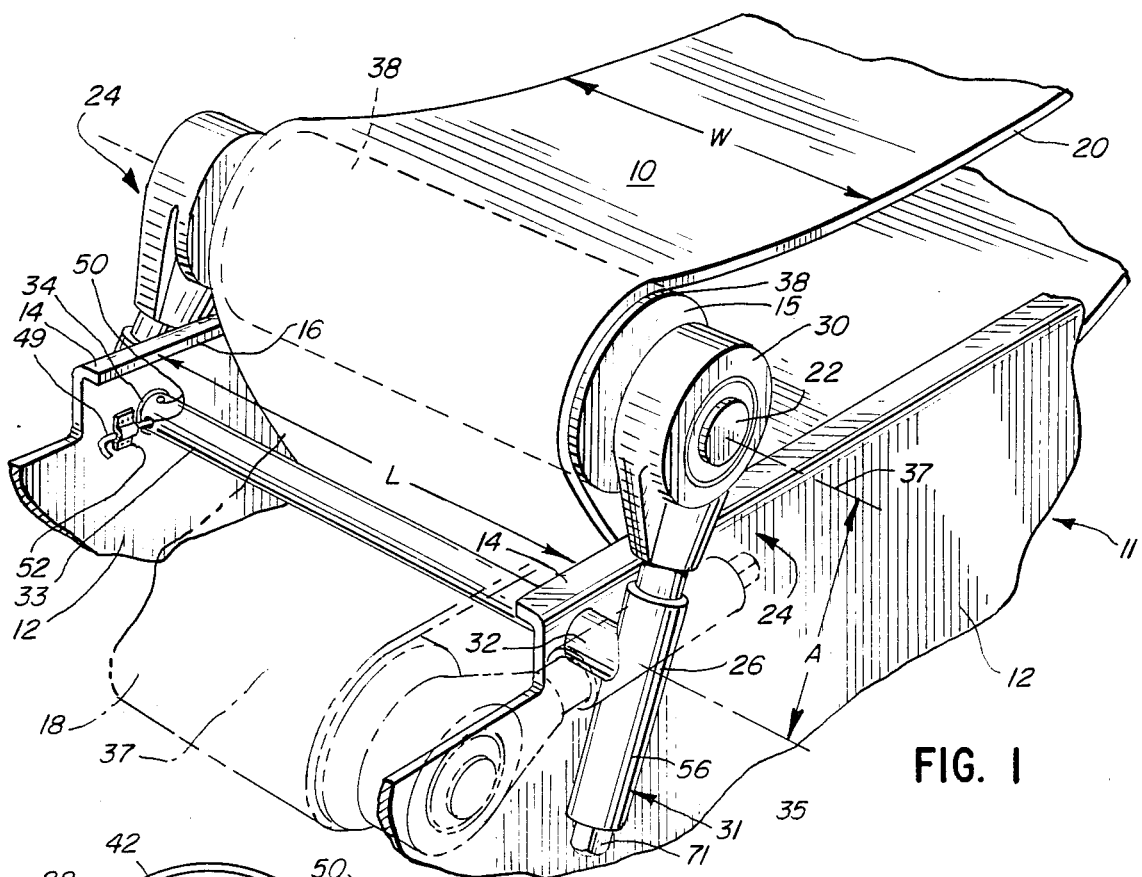
FIG. 1 is a fragmentary, perspective view of a conveyor system incorporating a take-up apparatus according to the present invention.
Figure 2:
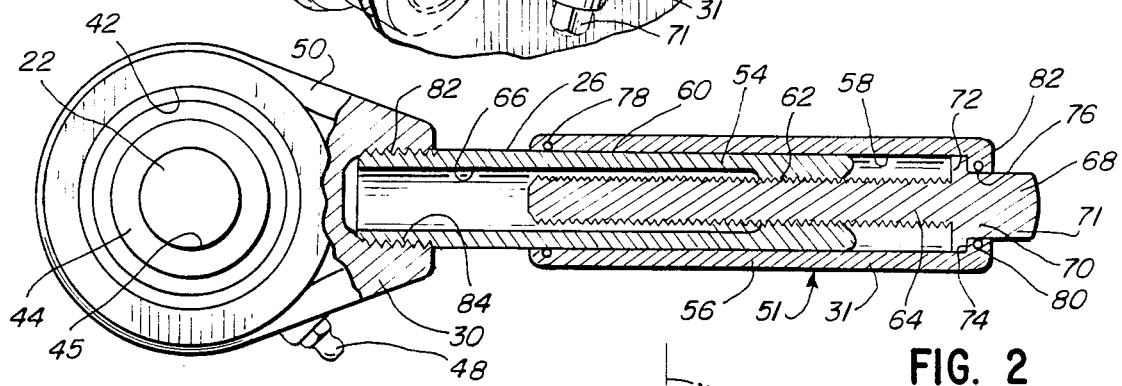
FIG. 2 is a side elevation view of the take-up apparatus of FIG. 1 shown partially broken away and in section to reveal a length adjustment mechanism.
Figure 3:
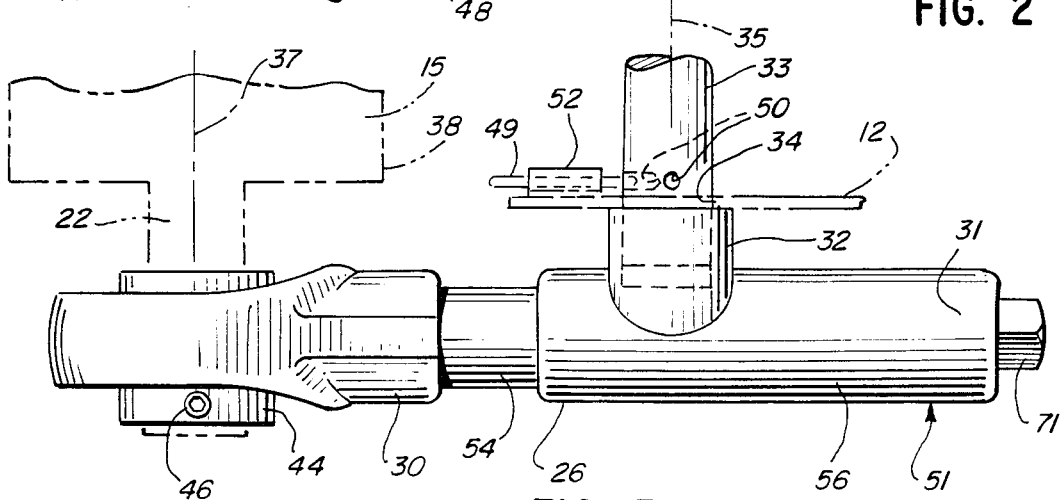
FIG. 3 is a plan view of one take-up apparatus of FIG. 2 in assembled relationship with a pulley of the conveyor system.

A preferred form of the invention of a take-up apparatus is depicted in FIGS. 1-3 in combination with a conventional conveyor system having an endless, flexible, conveying belt 10 in a housing, generally designated 11. The housing 11 comprises two laterally spaced, upright walls 12, with opposed, laterally inturned flanges 14. The free edges 16 of the flanges 14 are spaced a distance L which is slightly greater than the width W of the belt 10.

The region 18 between the walls 12 and beneath the flanges 14 is substantially unobstructed to receive the belt 10 and associated pulleys 15, only one pulley being shown, in a tensioned state as depicted in phantom in FIG. 1. In the tensioned state, the upper surface of the belt 10 could be substantially flush with the upper surface of the flanges 14. This construction permits conveyance of articles larger than the width W of the belt without interference with the walls 12. The close spacing between the edges 20 of the belt and the free edges 16 of the flanges obstructs the passage of foreign material below the belt and into the region 18.

The belt is suspended by spaced, rotatable pulleys 15 (one shown), each pulley having a shaft 22 with a rotational axis extending transversely to the length of the belt 10. The pulley 15 illustrated is a guide pulley, to which the take-up apparatus, shown generally at 24 is preferably attached. To assist the belt adjustment, identical take-up apparatus 24 are provided at each end of the pulley shaft or axle 22. The other pulley, not shown, is a drive pulley and is mechanically driven and effects advancement of the belt about the drive and guide pulleys.

Each take-up apparatus 24 comprises a body portion 26 having an extendable bearing member or first end portion 30 and a sleeve member or second end portion 31. The sleeved end 31 has an integral cylindrical mounting boss 32 perpendicular to the sleeve length and connected between the ends of the sleeve for pivotally assembling the take-up apparatus with the housing 12. The mounting boss 32 receives and is affixed to one end of a pivot shaft 33 extending through a hole 34 in the adjacent wall 12. The connection between the boss 32 and the shaft may be by threading, key and spline or by welding. The mounting of the bosses 32 and shaft 33 through the walls 12 are such that the take-up apparatus and the shaft 33 are pivoted together about an axis 35 which is substantially parallel to the rotational axes 37 of the pulleys 15.

The pulley 15 has a cylindrical belt-engaging surface 38 and the central shaft 22 which is rotatably received in the extendable bearing or first end portion 30 of the take-up apparatus. The extendable end portion 30 has a housing 50 with a bore 42 for fixedly retaining a bearing 44. A set screw 46 maintains the connection between the bearing 44 and the shaft 22 of the pulley. The bearing has a bore 45 to closely receive the pulley shaft 22. A conventional grease fitting 48 is provided on the housing 50 and communicates with the bearing 44 to facilitate lubrication.

The sleeve member or second end portion 31 of the arm 26 serves as a mounting member and as one part of a tension adjusting mechanism 51. To achieve the relaxed position of the belt from the tensioned position shown in phantom in FIG. 1, the pulley 15 and associated take-up assemblies 24 are pivoted clockwise so that the pulley 15 is elevated and disposed upward out of the normal operating plane of the belt. The belt sags substantially under its own weight between the guide pulley 15 and the drive pulley, not shown. To gain access to the region 18 between the walls 12, one need only raise the sagging portion of the belt. The guide pulley 15 is retained in one of two positions by means of a spring plunger 49 and a pair of detents 50. That is, a bracket 52 is secured to the inside of one or both walls 12 in close proximity to the shaft 33. The spring urged plunger 49 is slidably positioned in the bracket 52 with the end of the plunger 49 bearing against the shaft 33. A pair of detents 50, located roughly 90° apart, are formed in the shaft 33 with one detent aligned with and engaged by the plunger 49 when the pulley is in the operative plane of the belt and with the second detent engaged by the plunger when the pulley is raised out of the operative plane such as shown in solid lines in FIG. 1. As an alternate construction, two stops could be provided on the outside of the wall 12 against one of which the sleeve end portion of the take-up assembly rests when the pulley is either in the operative position or in the raised position.

In another aspect of the invention, the length A of the pick-up apparatus between the pivot axis 35 of the mounting boss 32 and the axis of rotation of the pulley 15 is adjustable to compensate for variations in belt dimension and/or stretching caused by continued use of the belt 10. To accomplish this end, the sleeve portion 31 is made up of inner and outer, telescoping cylindrical members, respectively, 54 and 56. The inside annular surface 58 of the outer cylinder 56 mates closely with the outer surface 60 of the inner cylinder 54. The inner cylinder 54 has a thickened wall at one end 62 and is internally bored and threaded to receive an adjusting screw or threaded member 64. The threaded end 62 of cylinder 54 maintains the adjusting screw 64 centered within the inner cylinder 54 and spaced from the inside wall 66 thereof to prevent binding.

The threaded member or screw 64 has an enlarged head 68 including a cylindrical portion 70, a shaped portion 71 and an annular flange 72 with the outer diameter of the flange being substantially equal to that of the inside surface 58 of the outer cylinder 56. In operation, the flange 72 bears against a shoulder 74 about a restricted opening 76 at the end of a cylinder 56. The cylindrical portion 70 of the head 68 extends through the opening 76 with the shaped portion 71 protruding outwardly to facilitate grasping by a user. Rotation of the screw by a wrench or tool on shaped portion 71 in a first direction advances the inner cylinder 54 axially away from fixed outer cylinder 56 so as to increase the length of the pick-up apparatus and the dimension A, while rotation in an opposite direction accomplishes a shortening of the pick-up apparatus.

To maintain a watertight and dustproof seal between the cylinders 54, 56, an O-ring 78 is disposed between the engaging cylindrical surfaces 58, 60. Further, an O-ring 80 is disposed in the opening 76 between the head 68 of the adjusting screw 64 and the inturned wall 82. An enclosed length adjustment structure results.

The end 82 of the inner cylinder 54 opposite the one end 62 is threaded and mates with a correspondingly threaded internal bore in the housing 50. Other suitable fastening means for the housing 50 to the cylinder 54 are within the scope of the invention.

The above description is made for purposes of clarifying the above invention, with no unnecessary limitations to be derived therefrom.

I claim:

1. In a conveyor system of the type having a housing including laterally spaced, upright walls defining a space therebetween, an endless conveyor belt, a first pulley connected with the housing and having a rotational axis and a portion surroundingly engaged by the belt and a second pulley spaced from the first pulley and having a second shaft with a second rotational axis and a portion surroundingly engaged by the endless belt, an improved take-up assembly comprising:

a body member having first and second end portions;

means carried by the first end portion for rotatably receiving the shaft on the second pulley;

the second end portion having first and second cylindrical members telescopingly engaged, one within the other, said second cylindrical member being connected to said first end portion;

means pivotally engaging the first cylindrical member at a position between the axial ends of the first cylindrical member to one of the walls for rotation about a third pivot axis substantially parallel to the rotational axes of the pulleys;

whereby a portion of the first cylindrical member extends unsupported from the third pivot axis away from the first end portion; and means for varying the relative positions of the first and second cylindrical members so that the distance between the third pivot axis and the second rotational axis is adjustable to control the tension on the belt, said body member being rotated in a first direction about the third pivot axis for tensioning said conveyor belt and in a second direction causing the belt to relax, thereby permitting repositioning of the belt to gain access to the space between the upright walls for cleaning and/or repair of the conveyor system.

2. The apparatus of claim 1 wherein a take-up apparatus is provided on each said walls in operative engagement with the shaft on the second pulley whereby pivoting the two take-up apparatus will either tension the endless belt or provide slack in the endless belt.

3. The take-up assembly of claim 1 wherein an adjustment screw is threadably engaged with the second cylindrical member and has an enlarged head bearing against said first cylindrical member, whereupon rotation of the adjustment screw in a first direction moves the first and second cylindrical member axially away from each other, increasing the distance between the second and third axes to increase tension on the belt with the body member rotated in the first direction, and rotation of the adjustment screw opposite to the first direction decreases the distance between the second and third axes to decrease tension on the belt with the body member rotated in the first direction.

4. The take-up assembly of claim 3 wherein said first cylindrical member has a restricted end defining a shoulder and an opening therethrough, and said adjustment screw head extends through the opening and has a flange bearing against said shoulder, said head protruding beyond the restricted end of the first cylindrical member for manipulation by a user.

5. The take-up assembly of claim 4 wherein an annular seal is disposed between the head and the restricted end to prevent the passage of foreign matter.

6. The take-up assembly of claim 4 wherein an annular seal is disposed between the first and second cylindrical members to prevent the passage of foreign matter.

7. The take-up assembly of claim 1 wherein the means on the first end portion for receiving the shaft from the second pulley comprises a housing, a bearing and means mounting the bearing on the housing for receiving the shaft from the second pulley.

8. The take-up assembly of claim 7 wherein said housing is threadably engaged with the second cylindrical member.

9. The take-up assembly of claim 1 wherein means extend rigidly between the two take-up assemblies for simultaneous pivoting of said take-up assemblies.

10. The take-up assembly of claim 9 wherein plunger means are provided on at least one wall for engaging with spaced detent means on the means extending between the two take-up assemblies whereby the pulley carried by the take-up assemblies is held in one of two positions when the plunger means engages one or the other of the spaced detent means.

* * * * *